(12) United States Patent
Albright (10) Patent No.: US 9,704,410 B2
(45) Date of Patent: Jul. 11, 2017

(54) SYSTEM AND METHOD FOR PRE-SELECTION IN COMPUTER ADAPTIVE TESTS

(75) Inventor: Larry Eugene Albright, Alexandria, VA (US)

(73) Assignee: AMERICAN INSTITUTES FOR RESEARCH IN THE BEHAVIORAL SCIENCES, Washington, DC (US)

( * ) Notice: Subject to any disclaimer, the term of this patent is extended or adjusted under 35 U.S.C. 154(b) by 0 days.

(21) Appl. No.: 12/926,705

(22) Filed: Dec. 6, 2010

(65) Prior Publication Data
US 2011/0275049 A1    Nov. 10, 2011

Related U.S. Application Data

(60) Provisional application No. 61/266,694, filed on Dec. 4, 2009, provisional application No. 61/266,702, filed on Dec. 4, 2009.

(51) Int. Cl.
*G09B 7/00* (2006.01)

(52) U.S. Cl.
CPC ...................... *G09B 7/00* (2013.01)

(58) Field of Classification Search
CPC ... G09B 7/00; G09B 7/02; G09B 5/00; G09B 5/06; G09B 17/00; G09B 17/006; G09B 19/04; G09B 17/003; G09B 19/00; G09B 23/28; G09B 7/04; G09B 19/06; G09B 21/006; G09B 7/06; G09B 7/08
USPC ............................................. 434/362
See application file for complete search history.

(56) References Cited

U.S. PATENT DOCUMENTS

| 6,418,298 | B1 * | 7/2002 | Sonnenfeld | .................. 434/350 |
| 6,988,096 | B2 * | 1/2006 | Gupta et al. | |
| 2005/0026130 | A1 * | 2/2005 | Crowhurst et al. | ........... 434/362 |

* cited by examiner

*Primary Examiner* — Xuan Thai
*Assistant Examiner* — Robert P Bullington
(74) *Attorney, Agent, or Firm* — Steptoe & Johnson LLP (57) ABSTRACT

A system and method for administering tests at a computer terminal in communication with a remote location is provided. The method includes: establishing an initial threshold amount of questions, the initial threshold amount being a positive integer greater than one; sending to the computer terminal a first batch of questions that exceeds the threshold amount, the batch of questions having a substantially equal difficulty level; receiving an answer to one of the batch of questions; selecting, based on the answer to the one of the number of questions, a new question having a difficultly level different than the one of the number of questions; and sending the new question to the computer terminal.

23 Claims, 3 Drawing Sheets

SYSTEM AND METHOD FOR PRE-SELECTION IN COMPUTER ADAPTIVE TESTS

CROSS REFERENCE TO RELATED APPLICATIONS

The present application claims priority to U.S. Provisional Patent application 61/266,694, filed on Dec. 4, 2010, and U.S. Provisional Patent application 61/266,701 filed on Dec. 4, 2010, the disclosures of which is expressly incorporated by reference herein in their entireties.

BACKGROUND

1. Field of the Invention

The present invention relates to computer adaptive tests. More specifically, the present invention relates to a computer adaptive test that defers application of its ability algorithm for a certain number of questions or items to thereby reduce latency between questions while maintaining statistically accurate test results.

2. Background Information

Traditional methodologies for testing involve providing test-takers with a fixed set of common questions. The test-takers are graded on the test, and relative to each other, based on each individual's accuracy in the nature of the responses to the fixed set of common questions. A fixed test thus presents the same level of difficulty for each test-taker, regardless of the test-taker's individual level of ability. A drawback of such fixed tests is that they tend to provide superior precision for test-takers of medium ability, but less precision for test-takers with extremely high or low ability.

Adaptive tests are based on the principle that more precise test scores can be obtained if the questions are tailored to the ability level of the individual test-taker. This approach stems from the belief that test results are not meaningful if test questions are too difficult or too easy for the particular test-taker. In contrast, more can be understood of a test-taker's true ability level if the questions are more consistent with that ability level.

A computer adaptive test ("CAT") is a computer implementation of an adaptive testing methodology. Rather than a fixed set of questions that can be posed to a test-taker, a CAT has a pool of available questions at different skill levels from which to iteratively select a question. Typically, the system does not know the particular ability level of the test-taker, and thus selects an initial question (sometimes referred to in the art as an "item") from a pool of intermediate ability level questions.

The CAT will then grade the test-taker's answer to the question in substantially real time. If the test-taker performs well (either with an accurate absolute answer or with due consideration for partial credit) on the intermediate level question, then the CAT system will consider the test-taker's ability to be superior to its previous estimate and select a new question that is consistent with the perceived higher ability level. Conversely, if the test-taker performs poorly on the intermediate question, the CAT system will consider the test-taker's ability to be inferior to its previous estimate and select a new question that is consistent with the perceived lower ability level. This process continues iteratively until the test is concluded according to some pre-defined criteria.

A drawback of CAT is the manner in which the tests must be administered by the system. For security purposes, the questions cannot be stored locally at the computer terminal at which the test-taker takes the test ("testing terminal"). Rather, the questions are stored on testing servers at some secure remote location and forwarded to the testing computer terminal as needed over a network such as the Internet. Similarly, the algorithm that updates the student's ability level and selects appropriate questions will be at the secure remote location.

This distance between the remote location and the testing terminal generates a delay based on the following steps that must occur after a test-taker answers a question before the next question can be presented to the test-taker:

The testing terminal transmits the answer to the current question to the remote location;

The system at the remote location evaluates the answer for accuracy;

Based on the answer, the system updates the test-taker's ability level pursuant to an algorithm;

A new question is selected based on the updated ability level;

The remote location sends the new question to the testing terminal; and

The testing terminal displays the new question.

Based on system traffic and network capabilities, these steps can result in a delay of several seconds between answers and subsequent questions that can distract a test-taker during a period when the test-taker needs to maintain concentration. The delay can be even longer if the questions include any substantial graphics, audio, and/or animation that require additional time to transmit and execute.

This resultant system latency is of sufficient concern that various techniques have been created to address it. One such attempt to address this drawback has been the use of decision trees to download potential future questions. Specifically, once a current question is provided during a test for the test-taker to answer, there are a finite number of possible outcomes or scores responsive to that current question. For each such possible outcome, the CAT can determine in advance what the next question would be. By way of example, if the question has only two outcomes—a correct or an incorrect answer—the CAT would determine in advance two potential next questions, one for each possible outcome. The remote location sends both possible questions to the testing terminal. Once the test-taker answers the current question, the testing terminal (either alone or in cooperation with the remote location) can determine which of the two "next" questions is proper. The testing terminal will post the selected question on the display, while the other question is effectively discarded.

Thus, for example, when an intermediate question is pending with a correct answer and an incorrect answer, the CAT already has selected and downloaded an "easier" question as the next question if the test-taker gets the answer wrong, and a "harder" question as the next question if the test-taker gets the answer right. Only one of the two will be selected based upon the test-taker's answer to the current question. This "look ahead" methodology can extend several questions down in the decision tree, thus allowing the pre-loading of several sequences of questions. The benefit of such a system is that since the "next" question is already resident on the testing terminal, the next question can be displayed without any significant latency difficulties (although there may still be delay as the testing terminal cooperates with the remote location to determine which of the possible questions should be used).

A drawback of the above approach is that CAT ends up devoting resources and bandwidth to download questions that never end up being used. This wasted bandwidth and resource consumption can become considerable as the CAT downloads questions from further down the decision tree; two items of look ahead (for dichotomous-only items) would require six potential items to be selected and downloaded (one for each possible score of each of the current item, and one for each possible score of each of the next potential items). The problem multiplies based on the number of test-takers who are simultaneously taking the test on the same network (e.g., all of the students at a school taking a particular standardized test). The decision-tree technique quickly degrades in efficacy as it exacerbates rather than abates the problems of network latency, given that many times more items will be downloaded than will be used.

The above methodology also presents security concerns. The correct answer must be transmitted across the network to the testing terminal to finalize the selection of the next question. In addition, questions that are not being used at a particular testing terminal (but which might be used at another) are exposed unnecessarily.

Another attempt to overcome these latency concerns is to bring "clones" of the testing servers to individual testing centers, such as an individual school or school district. These cloned servers contain the testing content and protocols and are physically placed at or near the premises of the target test-taker population, generally within the same internal network as the target population. The cloned server may also use the "look ahead" technique discussed above. The physical proximity greatly decreases network latency from server to testing terminal, improving response time for the test-taker and reducing the potential for disruptions in concentration (subject to the capabilities of the local area network separating the testing terminals and the cloned test server). However, the cloned server becomes a security risk, and the costs for transporting, installing, and maintaining the cloned server are considerable.

SUMMARY OF THE INVENTION

According to an embodiment of the invention, a method for administering tests at a computer terminal in communication with a remote location is provided. The method includes: establishing an initial threshold amount of questions, the initial threshold amount being a positive integer greater than one; sending to the computer terminal a first batch of questions that exceeds the threshold amount, the batch of questions having a substantially equal difficulty level; receiving an answer to one of the batch of questions; selecting, based on the answer to the one of the number of questions, a new question having a difficultly level different than the one of the number of questions; and sending the new question to the computer terminal.

The above embodiment may have various features. The initial threshold amount may remain constant during the test, or adjusting during the test, including increasing the initial threshold amount during the test to a higher threshold amount to reduce latency between the remote location and the computer terminal. The test has a predetermined total of questions, and the initial threshold amount may be less than or equal to approximately 10% of the predetermined total of questions. If the test has a number of strands, the initial threshold amount may be less than or equal to the number of strands.

According to another embodiment of the invention, a method for administering tests at a computer terminal in communication with a remote location is provided. The method includes: storing, at the remote location, a plurality of question sets, each set including at least one question; establishing a threshold amount of questions, the initial threshold amount being a positive integer greater than one and representing a minimum number of unanswered questions to be resident on the computer terminal; repeatedly sending from the remote location to the computer terminal a question set from the plurality of question sets until the number of questions sent to the computer terminal that remain unanswered is greater than the threshold amount; receiving an answer to a previously unanswered question; selecting, in response to the number of unanswered questions resident on the computer terminal being at the threshold amount, a new question set from the plurality of question sets based on the answer to the previously unanswered question; and sending the new question set to the computer terminal.

The above embodiment may have various features. All of the at least one question may have a substantially equal difficulty level. The new question set may have a difficulty level different than the previously unanswered question. The initial threshold amount may remain constant during the test, or adjusting during the test, including increasing the initial threshold amount during the test to a higher threshold amount to reduce latency between the remote location and the computer terminal. The test has a predetermined total of questions, and the initial threshold amount may be less than or equal to approximately 10% of the predetermined total of questions. If the test has a number of strands, the initial threshold amount may be less than or equal to the number of strands. The repeatedly may include discontinuing the repeatedly sending when the most recent question set sent includes a question that exceeds the threshold by one.

According to yet another embodiment of the invention, a method for administering tests on a computer terminal in communication with a remote location is provided. The method includes: establishing a threshold amount of questions, the initial threshold amount being a positive integer greater than one and representing a minimum number of unanswered questions to be resident on the computer terminal; repeatedly sending to the computer terminal a question set until the number of questions sent to the computer terminal that remain unanswered is greater than the threshold amount, each of the question sets including at least one question, all the at least one question having a substantially equal difficulty level; receiving an answer to a previously unanswered question; in response to the number of unanswered questions resident on the computer terminal being at the threshold amount, selecting, based on the answer to the previously unanswered question, a new question set having at least one question and having an ability level different than the previously unanswered question; and sending the new question set to the computer terminal.

The above embodiment may have various features. All of the at least one question may have a substantially equal difficulty level. The new question set may have a difficulty level different than the previously unanswered question. The initial threshold amount may remain constant during the test, or adjusting during the test, including increasing the initial threshold amount during the test to a higher threshold amount to reduce latency between the remote location and the computer terminal. The test has a predetermined total of questions, and the initial threshold amount may be less than or equal to approximately 10% of the predetermined total of questions. If the test has a number of strands, the initial threshold amount may be less than or equal to the number of strands. The repeatedly may include discontinuing the repeatedly sending when the most recent question set sent includes a question that exceeds the threshold by one.

According to still another embodiment of the invention, a method for administering a test is provided. The method includes: defining a total number of questions for a test; establishing a threshold amount of approximately 10% of the total number of questions; creating a fixed portion of the test having a total number of questions of about the threshold amount; sending the fixed portion of the test to a test taker; and transitioning the test from the fixed portion into an adaptive portion, comprising: receiving an answer to a previously unanswered question; adaptively selecting the next question based upon the received answer; and sending the next question to the test taker.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
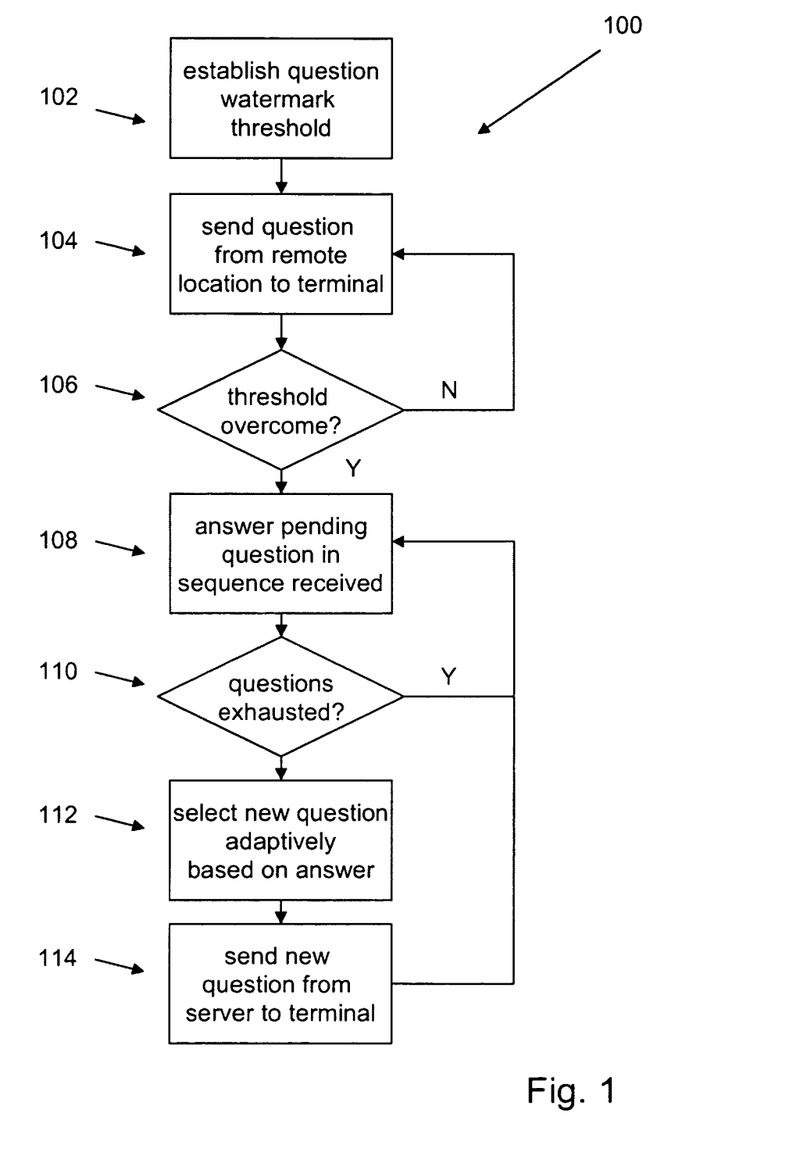
FIG. 1 is a flowchart of the processing of an embodiment of the invention.

Referring now to FIG. 1, an embodiment of the invention is shown generally at 100. At a step 102, an associated threshold for the number of unanswered questions that are pending, hereinafter a "low watermark," is established for the CAT test. The CAT system will preselect and ensure that the number of unanswered questions that are resident on a particular testing terminal exceeds the low watermark threshold. If the number of unanswered questions that are resident on a particular testing terminal exceeds the low watermark threshold, the testing terminal will pre-fetch new questions from the remote location until the threshold is exceeded.

By way of example, the low watermark level could be set to a value of three (3). A first Question A is downloaded from the remote location to the testing terminal at step 104, such that there is one (1) unanswered question on the testing terminal. As noted above, the first question in standard CAT methodologies is an intermediate level question; preferably the instant embodiment uses such a benchmark for Question A, but the invention is not so limited.

The testing terminal determines at step 106 that having only one (1) unanswered question is below the threshold of three (3) resident unanswered questions for the low watermark. The testing terminal thus automatically (and presumably before the test-taker has answered Question A) returns to step 104 and retrieves from the remote location the next question, hereinafter Question B. (For ease of discussion, in this example the individual Question B is obtained; however the invention is not so limited, and groups of questions could be obtained.)

In the prior art CAT methodology, the selection of a future question such as Question B depends on complete information on the answer to prior questions. Thus, in prior art CAT, the Question B would be based on how the test-taker answered the preceding Question A. In contrast, in the instant embodiment, the test-taker has not yet answered Question A, such that the ability algorithm has not yet been able to make any adjustment. Question B in the instant embodiment is thus based on the same ability level as Question A.

Now having Questions A and B resident, the testing terminal determines at step 106 that having only two (2) unanswered questions is still below the threshold of three (3) resident unanswered questions for the low watermark. The testing terminal thus automatically (and presumably still before the test-taker has answered Question A) returns to step 104 and retrieves from the remote location the next question, hereinafter Question C. As there still has been no ability update, Questions A-C are all at the same level.

One more question is needed to overcome the low watermark threshold of three (3), and thus the CAT repeats the above procedure to obtain a Question D, which is also at the same ability level as Questions A-C. Now that four (4) unanswered questions are present, the low watermark requirement is satisfied, and no further questions are obtained and downloaded at this time.

The test-taker will now proceed to answer the questions, preferably in the order received, and thus starting with Question A at step 108. As noted above, the standard CAT methodologies would have the testing terminal send the answer to Question A to the remote location for evaluation, followed by a subsequent updating of the ability level; preferably the instant embodiment follows that same sequence for Question A. (For ease of discussion, the further description below will refer only to this methodology, but the invention is not so limited, and other protocols can be used). A new question is selected based on the updated ability level at step 112, which is then downloaded to the testing terminal as Question E at step 114. Questions A-D are thus based on a fixed test methodology, while question E and subsequent questions are based on adaptive test methodologies.

The test taker will now proceed to answer Question B at step 108. The testing terminal sends the answer to Question B to the remote location for evaluation. The system subsequently updates the ability level of the test taker based on the answer to the previously unanswered Question B. A new question is selected at step 112 based on the updated ability level. This new question is then downloaded to the testing terminal as Question F at step 114.

The above process continues iteratively until the required number of questions for the test is complete. At some point the test-taker will be close enough to the end of the test that the number of questions remaining in the test is less than or equal to the low watermark, indicated in the process flow of FIG. 1 at step 110. At this point the instant embodiment can preferably discontinue obtaining further questions, and process iteratively through step 108 until all questions are answered and the test is concluded. (In the alternative, it is possible, albeit not desirable, for the CAT to maintain its cycle and continue to obtain questions from the pool, even though the questions will not be used).

As noted above, the standard CAT methodologies would generate each new question based on the answers to all preceding questions; each new question is thus based on the most updated and complete information. In contrast, the instant embodiment bases its ability levels on older questions without consideration for responses to the most recent questions, and specifically the most recent number of questions earlier than the current question by the value of the low watermark. Stated more simply, while prior art CAT updates ability and uses the updated ability on a question-by-question basis in substantially real time, the instant embodiment is several questions behind in applying the ability update for new questions.

Thus, if the low watermark is equal to three (3), the CAT methodology of the instant embodiment selects a new question without reference to the answers to the three (3) most recent questions. Phrased differently, Question E will be based on the answer to Question A, but not on the three most recently downloaded Questions B-D.

Application of the instant embodiment minimizes (if not outright eliminates) latency found in prior art CAT methods. The low watermark level allows for the pre-download of a series of future questions. Thus, similar to the "look ahead" prior art method, the test-taker can pull up subsequent questions without any latency consequences (and indeed, as there is no need to confirm answers with the remote location before loading the next question, the instant embodiment can be even faster than the "look ahead" method). Yet unlike the "look ahead" method, there is no download of alternative questions at different ability levels that will ultimately not be used, and thus no wasted bandwidth or security concerns.

The prior art CAT method derives its accuracy from the fact that each question is selected based on the most current ability level. Since the embodiment of the present invention selects new questions based on responses to earlier questions but without reliance on responses to the most recent questions, the test results of the instant embodiment are not technically as accurate as the prior art CAT method. However, if the low watermark level is small enough, the difference in results between the prior art CAT method and the instant embodiment is negligible. For example, so long as the low watermark level is less than or equal to about 10% of the total questions, the differences in scores for a test using the instant embodiment versus the prior art CAT method are statistically insignificant. Thus, a low watermark of four (4) or less would be appropriate for a test of 40 questions. In this manner the instant embodiments are quasi-adaptive in that they begin with fixed questions in an amount consistent with the watermark and then transition into adaptive testing methodology in response to answers to the initial fixed questions.

The instant embodiment thus provides a CAT methodology that is, within acceptable statistical norms, as accurate as the prior art CAT method, yet without the latency concerns. There is also no need for the "cloned" servers and their corresponding cost and security risks. Servers for the instant embodiment may be centrally located in a secure facility. Only the optimal number of servers is required to service the test-taker population. Only content that will be administered is downloaded to the testing terminal, minimizing test item security exposure issues. Item answer keys remain on the server and are never exposed.

The selection of the value of the watermark is preferably based on a variety of factors. An important goal of the embodiments is to reduce latency, such that the value of the low watermark needs to be large enough to minimize the onset of latency. This may involve consideration of the features of the questions, in that questions that leverage graphics, audio, and/or animation may present an increase in latency. The larger the value of the low watermark, the less chance there is that latency will influence the environment of the presentation of questions to the test-taker.

While this latency parameters counsel extremely in favor of large values for low watermarks, as a practical matter the accuracy of the test will degrade for larger values. As noted above, the low watermark value should be small enough (e.g., less than or equal to about 10% of test size) to preserve the desired degree of statistical accuracy relative to prior art CAT. A larger percentage may be acceptable to the extent that a particular use of the methodology is tolerant of larger statistical deviations, while a smaller percentage may be necessary if excessive accuracy is required.

Another factor that may influence the value of the low watermark is the presence of "strands" in a particular test. "Strands" refer to common topics of questions within a larger type of test. For example, the test may be a math test, but includes three "strands": algebra questions, geometry questions, and trigonometry questions. CAT ability algorithms are based in part upon a test-taker's ability within strands. To allow this feature of the ability algorithm to function optimally, the low watermark value is preferably less than or equal to the number of strands within a test. By way of example, for a 40 question test with three (3) strands, a low watermark value of four (4) may be small enough for statistically accurate results, but a low watermark of three (3) or less would nonetheless be preferred based on the number of strands, especially when the selection algorithm cycles items among the strands, since by the time a strand selection repeats, all item scores for that strand are available to the ability estimator.

Figure 2:
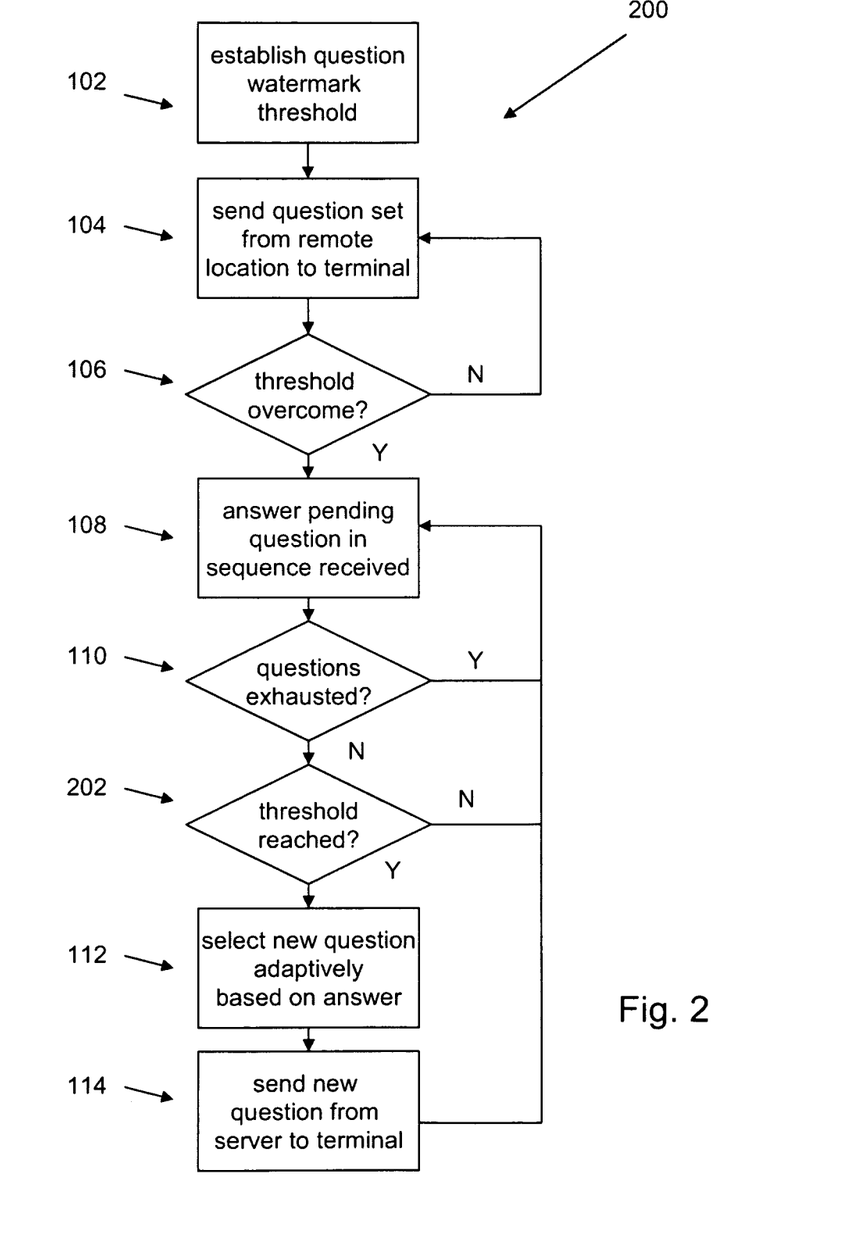
FIG. 2 is a flowchart of the processing of another embodiment of the invention.

In the above embodiment, the system presented individual questions for answers. Referring now to FIG. 2, in an alternative embodiment 200, questions could be delivered in groups. By way of non-limiting example, the CAT may provide a passage for the test-taker to read, along with a group of questions for the test-taker to answer about the passage. In this embodiment, the number of unanswered questions within the group is compared against the low watermark level. If the group has ten (10) questions, and the low watermark is three (3), then the CAT of the instant embodiment will not obtain a new question (or group of questions) until the test-taker has answered seven (7) of the ten (10) questions, thus leaving three (3) unanswered questions. If the group has two (2) questions, and the low watermark is three (3), then the CAT will automatically obtain and download the next question (or group of questions). In this context, question sets are sent, each set including at least one question. The methodology is the same as in FIG. 1, save that at step 202 a check is made to see whether or not the number of unanswered questions meets the watermark, thus requiring obtaining the next question; otherwise the system can continue to process answers from the backlog of questions sent in the most recent question set.

For ease of discussion, various references are made above to obtaining a new or next question. While this implies single question retrieval, the invention is not so limited. The system could obtain and download several related questions at a common ability level, such as for the reading passage example above.

Applicant notes that the use of three (3) as the low watermark is exemplary only. It could be any number as desired, and the above methodology would repeat as many times as necessary to satisfy that number. The number could be fixed across the system for a particular test, or can be fluid and change as test conditions warrant toward an ultimate goal of minimizing latency via pre-fetch of questions. It is possible that for some conditions the low watermark value could be zero (although this would not be the case for an entire test).

Preferably the low watermark number is static for a particular test implementation. However, the invention is not so limited. The system could be programmed to adjust the low watermark under different test conditions, either test-wide or for individual test takers. For example, if the system detected that the network was slow and thus the latency unusually high, it could increase the low watermark for all test-takers on that network. If a particular testing terminal was having specific latency concerns, the system could increase the low watermark for that specific testing terminal. Similarly, the system could reduce the value of the low watermark if desired.

In the above embodiments, the testing terminal and remote location cooperate after each answer to check the answer and update the ability algorithm. However, the invention is not so limited, in that such near real-time updating may be unnecessary. For example, in the example above for ten (10) questions and a low watermark of three (3), the system can defer activity until the number of unanswered questions nears or reaches the low watermark.

In the embodiments herein, the system will obtain new questions if the number of unanswered questions exceeds the low watermark. However, other mathematical representations could be used to obtain similar effects.

Figure 3:
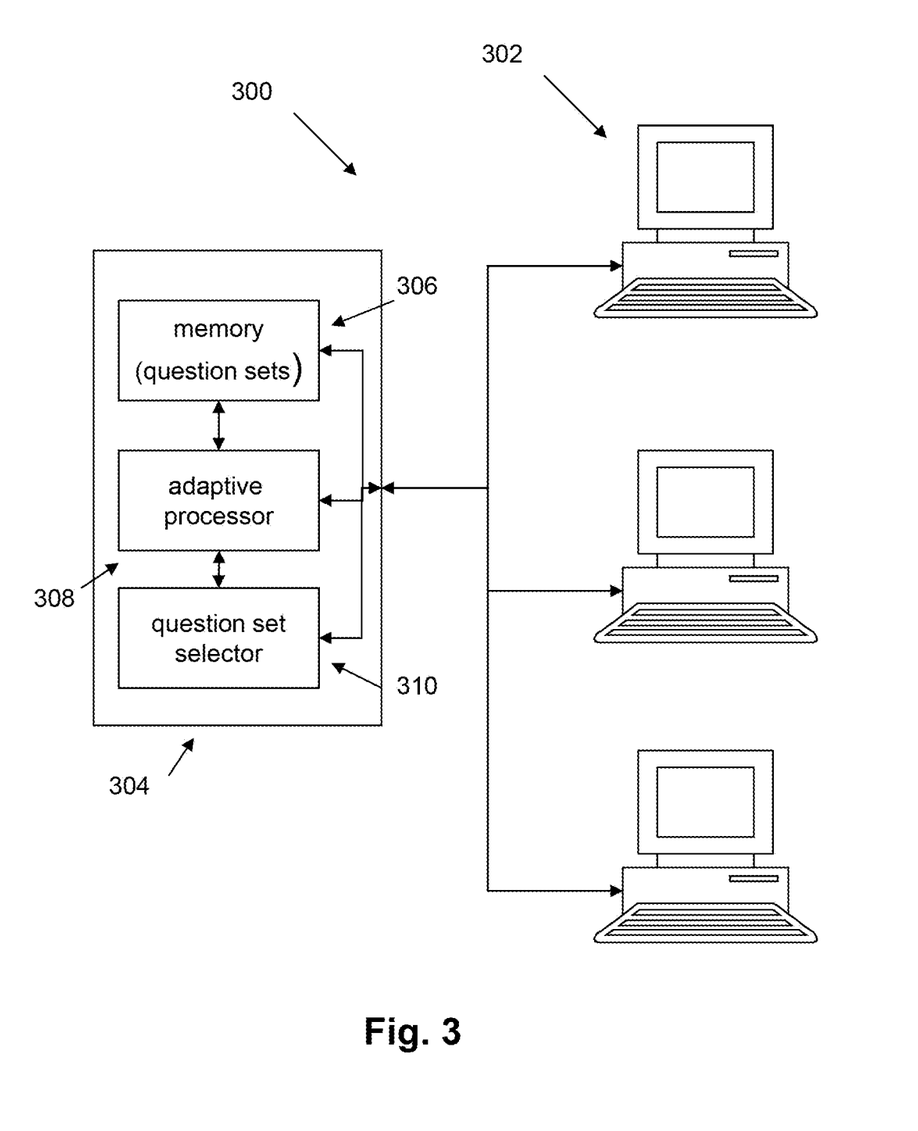
FIG. 3 shows an example of physical architecture 300 of an embodiment of the invention.

FIG. 3 shows architecture for an embodiment of the invention. A series of computer terminals 302 are connected to a remote location 302, which may be one or more remote servers. The remote location includes hardware and/or software modules including a memory module 306 to store question sets, an adaptive processor module 308 to evaluate the test-taker's ability/difficulty level based upon the responses to questions, and a question set selector module 310 to select a new question set from memory to send as the next question set.

Various functions in the above embodiments are attributed to either the computer terminal 302 or the remote location 304 to which it cooperated with. It is to be understood that such distributed functionality is exemplary, and that the functionality can be distributed at the remote location or the computer terminal as may be desired. Also, remote location 304 is used in the broad sense and is not limited to a single or centralized source, but may include storage and/or functionality consolidated on or dispersed over computer hardware components with appropriate software thereon that is not coextensive with the computer terminal 302 on which the test is administered. One or more remote servers are a none-limiting example of a remote location.

Ability level or difficulty level in the context of the above embodiments refers to categories of questions rather than individual questions. In an absolute sense, two different questions will have some degree of difference in difficulty (although the distinction may be so small as to be not noticeable). However, questions are, through known methodologies, classified by certain groups. By way of non-limiting example, a question could be consistent with a $1^{st}$, $2^{nd}$ or $3^{rd}$ grade reading level, such that an answer to a second grade level question would result in the next question being from the first or third grade groupings, based on whether the answer was incorrect or correct, respectively. The invention is not limited to any particular methodology for determining what questions correspond to what ability levels. Preferably, the pool of questions and/or question sets have already been assessed at relevant ability levels before the test is administered.

The foregoing description of various embodiments of the present invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated.

What is claimed is:

1. A method for administering tests at a computer terminal in communication with a remote location, the method comprising:
   associating an ability level with a category of questions with equal difficulty;
   wherein the ability level is based on a test taker's ability within the category of questions;
   establishing an initial threshold amount of unanswered questions that are pending, the initial threshold amount being a positive integer greater than one, representing a minimum number of answered questions to be resident on the computer terminal;
   sending to the computer terminal a first batch of questions that exceeds the initial threshold amount, the batch of questions having a substantially equal ability level;
   receiving an answer to one of the batch of questions;
   updating the ability level based on the answer to one of the number of questions;
   selecting, based on the ability level update, a new question having an ability level different than the one of the number of questions;
   sending the new question to the computer terminal;
   pre-fetching new questions from the remote location until the initial threshold amount is exceeded; and
   deferring application of the ability level update until the initial threshold amount is exceeded.

2. The method of claim 1, further comprising: maintaining the initial threshold amount constant during the test.

3. The method of claim 1, further comprising adjusting the initial threshold amount during the test.

4. The method of claim 3, wherein the adjusting comprises increasing the initial threshold amount during the test to a higher threshold amount that is greater than the initial threshold amount to reduce latency between the remote location and the computer terminal.

5. The method of claim 1, wherein the adaptive test has a predetermined total of questions, and the initial threshold amount is less than or equal to approximately 10% of the predetermined total of questions.

6. The method of claim 1, wherein the adaptive test has a number of strands, and the initial threshold amount is less than or equal to the number of strands.

7. A method for administering tests at a computer terminal in communication with a remote location, the method comprising:

storing, at the remote location, a plurality of question sets, each set including at least one question;
associating an ability level with a category of questions with equal difficulty;
wherein the ability level algorithm is based on a test taker's ability within the category of questions;
establishing an initial threshold amount of unanswered questions that are pending, the initial threshold amount being a positive integer greater than one and representing a minimum number of unanswered questions to be resident on the computer terminal;
repeatedly sending from the remote location to the computer terminal a question set from the plurality of question sets until the number of questions sent to the computer terminal that remain unanswered is greater than the initial threshold amount;
receiving an answer to a previously unanswered question;
updating the ability level based on the answer to the previously unanswered question;
selecting, in response to the number of unanswered questions resident on the computer terminal being at the initial threshold amount, a new question set from the plurality of question sets based on the ability level update;
sending the new question set to the computer terminal;
pre-fetching new questions from the remote location until the initial threshold amount is exceeded; and
deferring application of the ability update until the initial threshold amount is exceeded.

8. The method of claim 7, wherein all of the at least one question having a substantially equal difficulty level.

9. The method of claim 7, wherein the new question set has a difficulty level different than the previously unanswered question.

10. The method of claim 7, further comprising: maintaining the initial threshold amount constant during the test.

11. The method of claim 7, further comprising adjusting the initial threshold amount during the test.

12. The method of claim 11, further comprising: increasing the initial threshold amount during the test to a higher threshold amount that is greater than the initial threshold amount to reduce latency between the remote location and the computer terminal.

13. The method of claim 7, wherein the test has a predetermined total number of questions, and the initial threshold amount is less than or equal to approximately 10% of the predetermined total number of questions.

14. The method of claim 7, wherein the test has a number of strands, and the initial threshold amount is less than or equal to the number of strands.

15. The method of claim 7, wherein the repeatedly sending further comprises: discontinuing the repeatedly sending when the most recent question set sent includes a question that exceeds the initial threshold amount by one.

16. A method for administering tests on a computer terminal in communication with a remote location, the method comprising:
associating an ability level with a category of questions with equal difficulty;
wherein the ability level algorithm is based on a test taker's ability within the category of questions;
establishing an initial threshold amount of unanswered questions that are pending, the initial threshold amount being a positive integer greater than one and representing a minimum number of unanswered questions to be resident on the computer terminal;
repeatedly sending to the computer terminal a question set until the number of questions sent to the computer terminal that remain unanswered is greater than the initial threshold amount, each of the question sets including at least one question, all the at least one question having a substantially equal difficulty level;
receiving an answer to a previously unanswered question;
updating the ability level based on the answer to the previously unanswered question;
in response to the number of unanswered questions resident on the computer terminal being at the initial threshold amount, selecting, based on the ability level update, a new question set having at least one question and having an ability level different than the previously unanswered question;
sending the new question set to the computer terminal;
pre-fetching new questions from the remote location until the initial threshold amount is exceeded; and
deferring application of the ability level update until the initial threshold amount is exceeded.

17. The method of claim 16, further comprising: maintaining the initial threshold amount constant during the test.

18. The method of claim 16, further comprising adjusting the initial threshold amount during the test.

19. The method of claim 18, further comprising: increasing the initial threshold amount during the test to a higher threshold amount that is greater than the initial threshold amount to reduce latency between the remote location and the computer terminal.

20. The method of claim 16, wherein the adaptive test has a predetermined total of questions, and the initial threshold amount is less than or equal to approximately 10% of the predetermined total of questions.

21. The method of claim 16, wherein the adaptive test has a number of strands, and the initial threshold amount is less than or equal to the number of strands.

22. The method of claim 16, wherein the repeatedly sending further comprises: discontinuing the repeatedly sending when the most recent question set sent includes a question that exceeds the initial threshold amount by one.

23. A method for administering a test, comprising:
defining a total number of questions for a test;
associating an ability level with a category of questions with equal difficulty;
wherein the ability level algorithm is based on a test taker's ability within the category of questions;
establishing an initial threshold amount of approximately 10% of the total number of questions;
creating a fixed portion of the test having a total number of questions of about the initial threshold amount;
sending the fixed portion of the test to a test taker;
transitioning the test from the fixed portion into an adaptive portion, comprising:
receiving an answer to a previously unanswered question;
updating the ability level based on the answer to the previously unanswered question;
adaptively selecting the next question based upon the ability level update;
sending the next question to the test taker;
pre-fetching new questions from a remote location until the initial threshold amount is exceeded; and
deferring application of the ability level update until the initial threshold amount is exceeded.

* * * * *

UNITED STATES PATENT AND TRADEMARK OFFICE
CERTIFICATE OF CORRECTION

PATENT NO. : 9,704,410 B2
APPLICATION NO. : 12/926705
DATED : July 11, 2017
INVENTOR(S) : Larry Eugene Albright Page 1 of 1

It is certified that error appears in the above-identified patent and that said Letters Patent is hereby corrected as shown below:

On the Title Page (60) appears as follows:
Provisional application No. 61/266,694, filed on Dec. 4, 2009, provisional application No. 61/266,702, filed on Dec. 4, 2009.

The corrected statement should read:
Provisional application No. 61/266,694, filed on Dec. 4, 2009, provisional application No. 61/266,701, filed on Dec. 4, 2009.

Signed and Sealed this
Twenty-first Day of August, 2018

Andrei Iancu
*Director of the United States Patent and Trademark Office*